United States Patent
Morita et al.

(10) Patent No.: US 7,131,669 B2
(45) Date of Patent: Nov. 7, 2006

(54) GUIDE DEVICE FOR AUTOMOBILE SEATBELT

(75) Inventors: Rikiya Morita, Tokyo (JP); Hiroyuki Miura, Tokyo (JP); Jun Chida, Tokyo (JP); Teruo Matsuzaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 362 days.

(21) Appl. No.: 10/734,575

(22) Filed: Dec. 12, 2003

(65) Prior Publication Data

US 2004/0124690 A1 Jul. 1, 2004

(30) Foreign Application Priority Data

Dec. 20, 2002 (JP) .............................. 2002-370725

(51) Int. Cl.
*B60R 22/00* (2006.01)
(52) U.S. Cl. ..................................................... 280/808
(58) Field of Classification Search ............... 280/808, 280/801.1, 807, 801.2; 297/471, 473, 474, 297/475, 481, 482, 483, 486, 487, 468
See application file for complete search history.

(56) References Cited

U.S. PATENT DOCUMENTS

| | | | | |
|---|---|---|---|---|
| 4,033,594 A | * | 7/1977 | Lindblad | 297/481 |
| 4,056,271 A | * | 11/1977 | Imabuchi et al. | 280/804 |
| 4,341,359 A | * | 7/1982 | Jahn | 242/377 |
| 4,373,749 A | * | 2/1983 | Miki et al. | 280/807 |
| 4,607,864 A | * | 8/1986 | Kouketsu et al. | 280/808 |
| 4,645,234 A | * | 2/1987 | Koide | 280/808 |
| 4,730,875 A | * | 3/1988 | Yoshitsugu | 297/468 |
| 4,786,078 A | * | 11/1988 | Schreier et al. | 280/808 |
| 4,982,982 A | * | 1/1991 | Nishimura | 280/808 |
| 5,080,440 A | * | 1/1992 | Tagawa | 297/474 |
| 5,139,282 A | * | 8/1992 | Mein | 280/808 |
| 5,149,135 A | * | 9/1992 | Konishi et al. | 280/806 |
| 5,160,167 A | * | 11/1992 | Fourrey et al. | 280/806 |
| 5,176,402 A | * | 1/1993 | Coulon | 280/807 |
| 5,340,198 A | * | 8/1994 | Murphy et al. | 297/483 |
| 5,385,370 A | * | 1/1995 | Wickenheiser et al. | 280/808 |
| 5,393,091 A | * | 2/1995 | Tanaka et al. | 280/733 |
| 5,398,997 A | * | 3/1995 | McFalls | 297/476 |
| 5,411,292 A | * | 5/1995 | Collins et al. | 280/806 |
| 5,431,448 A | * | 7/1995 | Ball et al. | 280/808 |

(Continued)

FOREIGN PATENT DOCUMENTS

DE 25 45 890 A1 4/1977

(Continued)

*Primary Examiner*—Eric Culbreth
*Assistant Examiner*—Barry Gooden, Jr.
(74) *Attorney, Agent, or Firm*—Darby & Darby

(57) ABSTRACT

In a vehicle, a seatbelt extracted from a retractor is extended to and suspended by a webbing guide portion of a first rod, folded back in a predetermined direction by the webbing guide portion, and extended from a belt drawing-out portion. A load applied to the webbing guide portion when the seatbelt contacts it is dispersed by the first rod and one or more additional rods to prevent the load from concentrating at a portion of a body of the vehicle where the first rod is attached. As a result, it is not necessary to provide a large bracket for attaching the first rod to the vehicle body. With this arrangement, the weight and the cost of parts can be reduced while securing the strength thereof and realizing a belt folding-back function, and further a degree of design freedom of the layout can be improved.

7 Claims, 8 Drawing Sheets

U.S. PATENT DOCUMENTS

| | | | | |
|---|---|---|---|---|
| 5,439,253 A | * | 8/1995 | Trubiano | 280/801.1 |
| 5,487,564 A | * | 1/1996 | Fueller et al. | 280/808 |
| 5,516,148 A | * | 5/1996 | Ohira | 280/808 |
| 5,590,907 A | * | 1/1997 | McQueen, II et al. | 280/801.1 |
| 6,139,059 A | * | 10/2000 | Metzger | 280/808 |
| 6,168,206 B1 | * | 1/2001 | Greib et al. | 280/808 |
| 6,217,069 B1 | * | 4/2001 | Ganesan | 280/801.1 |
| 6,267,410 B1 | * | 7/2001 | Koketsu et al. | 280/801.1 |
| 6,276,715 B1 | * | 8/2001 | Takeuchi | 280/733 |
| 6,450,534 B1 | * | 9/2002 | Blakesley et al. | 280/801.1 |
| 6,474,691 B1 | * | 11/2002 | Izume et al. | 280/801.1 |
| 6,499,786 B1 | * | 12/2002 | Takahashi | 296/65.03 |
| 6,520,588 B1 | * | 2/2003 | Busch | 297/483 |
| 6,702,327 B1 | * | 3/2004 | Janz | 280/808 |
| 6,715,793 B1 | * | 4/2004 | Okubo | 280/808 |
| 2004/0036268 A1 | * | 2/2004 | Bertelle et al. | 280/801.1 |

FOREIGN PATENT DOCUMENTS

| | | |
|---|---|---|
| DE | 199 01 784 A1 | 8/1999 |
| JP | 7-13619 | 3/1995 |
| JP | 1-071929 A1 | 3/1998 |
| JP | 10-236277 A1 | 9/1998 |
| JP | 11-198755 A1 | 7/1999 |

* cited by examiner

GUIDE DEVICE FOR AUTOMOBILE SEATBELT

The disclosure of Japanese Patent Application No. 2002-370725 filed on Dec. 20, 2002, including the specification, drawings and abstract thereof, from which priority is claimed in accordance with 35 U.S.C. § 119, is incorporated herein by reference in its entirety.

BACKGROUND OF THE INVENTION

1. Field of the Invention

The present invention relates to a guide device of an automobile seatbelt for guiding a seatbelt drawn out from a retractor.

2. Related Art Statement

In recent years, there is a tendency to employ a three-point type seatbelt device also to a rear seat of vehicles such as automobiles and the like to improve the safety of passenger. As shown in FIG. 9, a shoulder belt, which is used in station wagons and the like to hold the chest of the passenger, is arranged such that a seatbelt (shoulder belt) 21 drawn out from a retractor 20 is attached by folding back with a sash guide stay 23 across a rear quarter glass 22.

Although this type of the sash guide stay 23 is disclosed as a shoulder anchor for a vertically adjusting mechanism in Japanese Unexamined Utility Model Application Publication No. 7-13619, it is not necessarily preferable for outside appearance because it is exposed to the side of a compartment.

In contrast, Japanese Unexamined Patent Application Publication No. 11-198755 discloses a seatbelt guide (guide device) disposed at a center portion of a rear tray although it is installed for a sedan type, and when this seatbelt guide is installed in the station wagon in the same manner, the good appearance of the compartment of the station wagon can be attained.

However, when the device disclosed in Japanese Unexamined Patent Application Publication No. 11-198755 is installed along a body side, the weight of the device increases as the sizes of the components constituting the device are increase to secure strength, and design freedom in regard to component layout is reduced. In particular, since the space behind the rear seat is used as a baggage room in the station wagons, the space in which the device can be installed is limited. Thus, it becomes important to reduce the weight and the size of the device and to increase the design freedom.

SUMMARY OF THE INVENTION

Accordingly, an object of the present invention is to provide a guide device for an automobile seatbelt capable of reducing a cost by realizing the reduction in size and weight of the guide device as well as capable of improving a design freedom of a layout while securing a required strength.

A brief explanation is as follows: the seatbelt guide device for an automobile according to the present invention guides a seatbelt drawn out of a retractor and comprises a first rod having a guide portion formed thereto for suspending and folding back a seatbelt, and a second rod for dispersing a load applied to the first rod, and the first rod and the second rod are restrained against each other and are secured to a body of the automobile.

The other features and advantages of the present invention will become sufficiently understood from the following explanation.

DETAILED DESCRIPTION OF THE PREFERRED EMBODIMENTS

Figure 1:
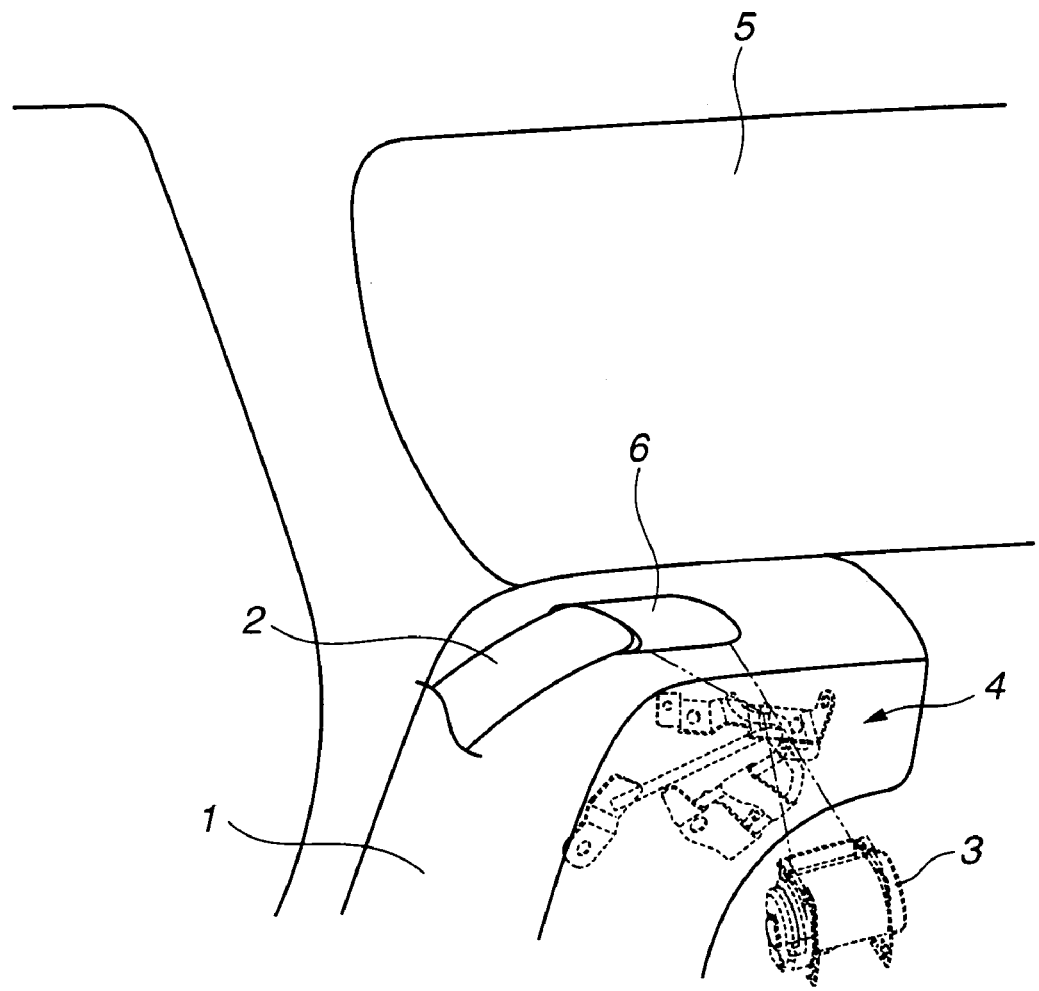
FIG. 1 is a view explaining a periphery of a rear quarter of an automobile according to a first embodiment of the present invention.

In FIG. 1, reference numeral 1 denotes a rear quarter trim disposed behind a rear seat of an automobile (not shown), and a known retractor 3 is disposed in the rear quarter trim 1 to wind a base end of a seatbelt 2 (shoulder belt) and to accommodate the seatbelt 2 into the rear quarter trim 1. The seatbelt 2 drawn out of the retractor 3 is guided through a seatbelt guide device 4 disposed in the rear quarter trim 1, extended from a belt extract unit 6 which is disposed on the rear quarter trim 1 at the lower end of a rear quarter glass 5, and coupled with a waist belt through a tongue (not shown).

In this embodiment, the seatbelt guide device 4 has a structure by combining a small bracket fixedly secured to a vehicle body and a rod, and has a required strength while reducing its weight. The seatbelt guide device 4 has a function for folding back the seatbelt 2 drawn out of the retractor 3 as well as reducing a load applied to the vehicle body by dispersing the load transmitted from the seatbelt 2.

Figure 2:
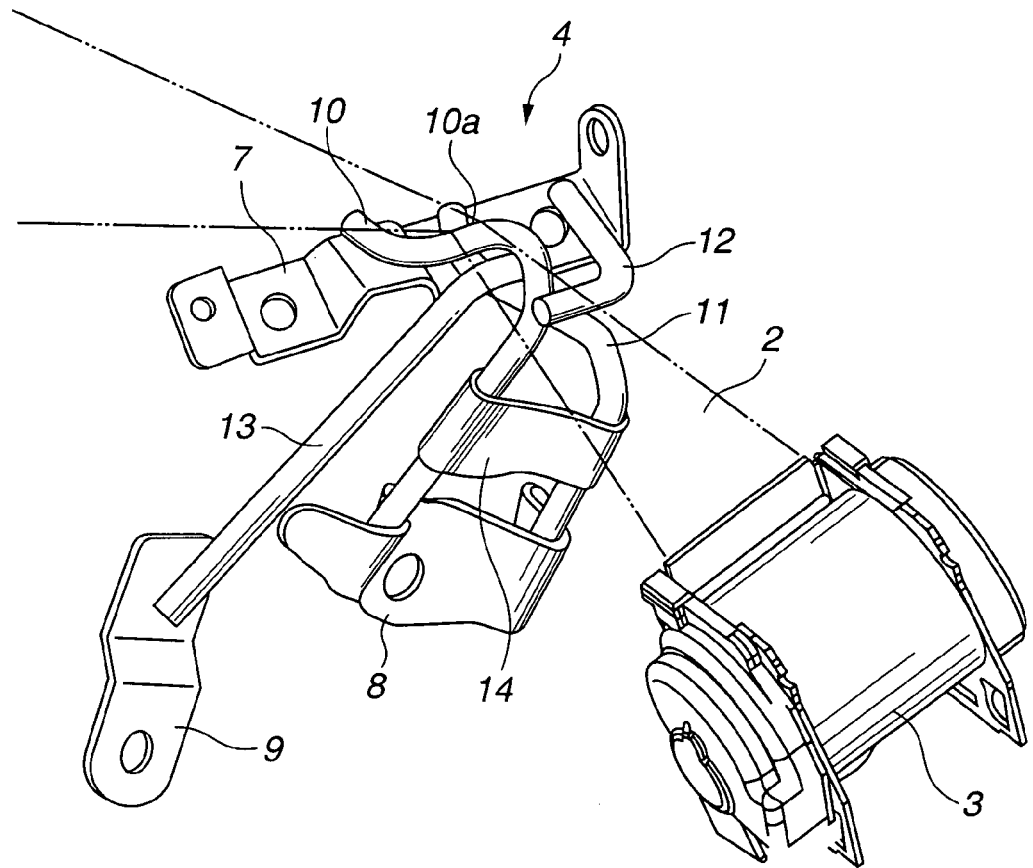
FIG. 2 is a perspective view showing an arrangement of a seatbelt guide device according to the first embodiment.
Figure 3:
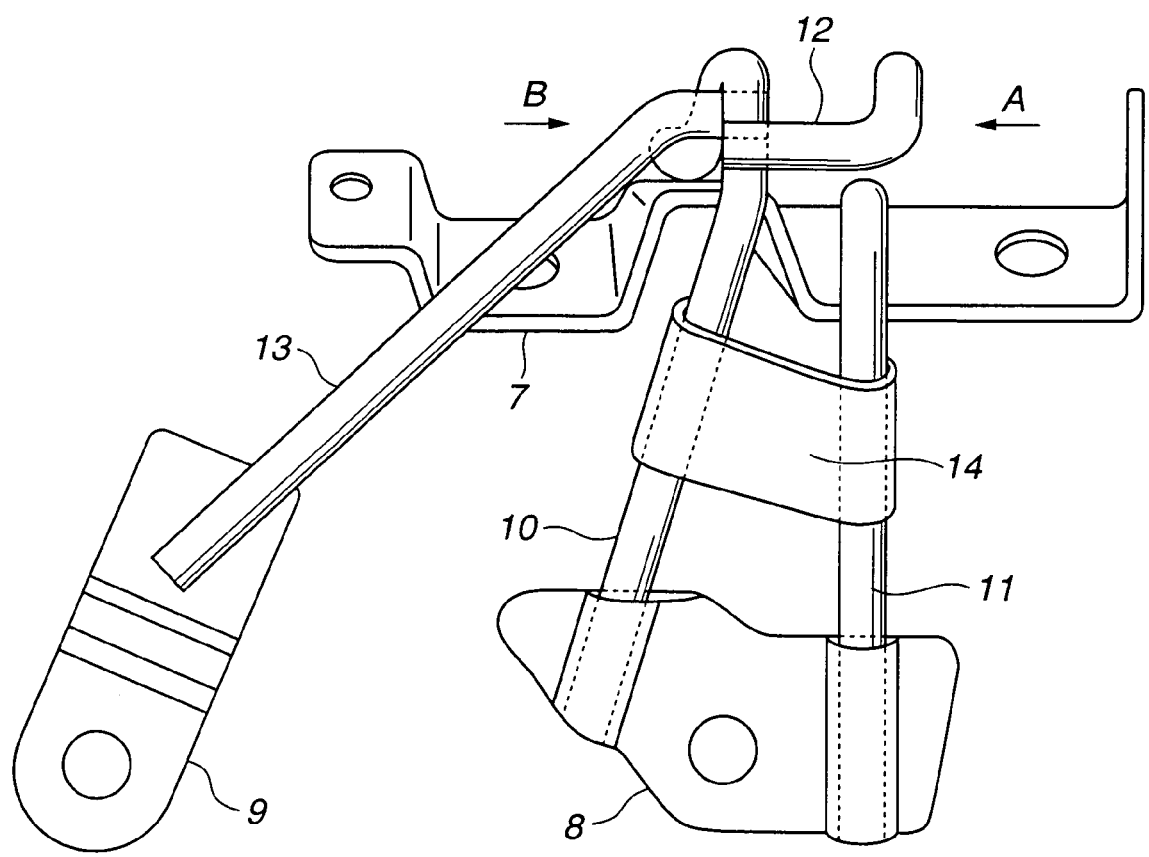
FIG. 3 is a side elevational view of the seatbelt guide device according to the first embodiment.

More specifically, as shown in FIGS. 2 and 3, the seatbelt guide device 4 comprises mainly brackets 7, 8, 9 and rods 10, 11, 12, 13. Each of the brackets 7, 8, 9 is formed by a sheet metal and secured to the vehicle body by bolts (not shown), and each of the rods 10, 11, 12 is formed by bending a metal rod member having a predetermined diameter. The respective rods 10, 11, 12, 13 are fixedly secured to the brackets 7, 8, 9 by welding and the like, and are also restrained against each other (except the rod 12 as described below) to secure a required strength.

In this Detailed Description, the rod 10 corresponds to a first rod of the present invention, the rod 11 corresponds to a third rod of the present invention, and the rod 13 corresponds to a second rod of the present invention. Further, in FIG. 3 showing a side elevational view, a bracket 7 may be viewed as indicating an upper direction of a portion of the vehicle body to which the guide device is attached, and a bracket 9 side as showing a front side thereof.

The bracket 7 is a slender bracket having holes, which are formed at both ends thereof and through which the bracket 7 is attached to the vehicle body, and a rib-shaped bent portion formed at approximately the center thereof. An end portion of the rod 10 is fixedly secured to the bent portion of the bracket 7, and an end portion of the rod 11 is fixedly secured to the bracket 7 in the vicinity of the rod 10.

The rod 10 constitutes a main portion of the seatbelt guide device 4 and has an arc-shaped webbing guide portion 10*a* formed thereto. The webbing guide portion 10*a*, formed by bending the rod 10, folds back and guides the seatbelt 2. An end portion of the rod 10 adjacent to the webbing guide portion 10*a* is fixedly secured to the bracket 7, and the base end of the rod-shaped straight portion thereof is secured to the bracket 8. Likewise, the rod 11 is also formed by bending a straight metal rod member to a shape approximately similar to that of the webbing guide portion 10*a*. The end portion of the rod 11 is fixedly secured to the bracket 7, and the base end of the rod-shaped straight portion thereof is fixedly secured to the bracket 8 together with the rod 10.

The bracket 7 is disposed to a first portion of the vehicle body facing the retractor 3 so that the webbing guide portion 10*a* of the rod 10 fixedly secured to the bracket 7 faces a desired belt folding back direction, and the straight portions of the rods 10 and 11 are extended in a direction obliquely intersecting the upper surface of the seatbelt 2. The base ends of both of the rods 10 and 11 are supported by the bracket 8 which is attached to a second portion of the vehicle body between the bracket 7 and the retractor 3. That is, the rod 11 acts as an auxiliary member for dispersing the load applied to the rod 10 and suppressing the deformation of the bracket 7.

The bracket 8 has two rib-shaped projections disposed approximately in parallel with each other on both the sides of an attachment hole defined approximately at the center of the bracket 8, through which it is attached to the vehicle body, and the base ends of the rods 10 and 11 are fixedly secured to the back surfaces of the respective projections. Further, a reinforcement member 14 formed of a thin sheet metal is wound around and fixedly secured to the straight portions of the rods 10 and 11 extending from the bracket 8 so that the rods 10 and 11 are prevented from falling down in an open direction by the reinforcement member 14 acting as a support member for coupling the rod 10 with the rod 11.

Figure 4:
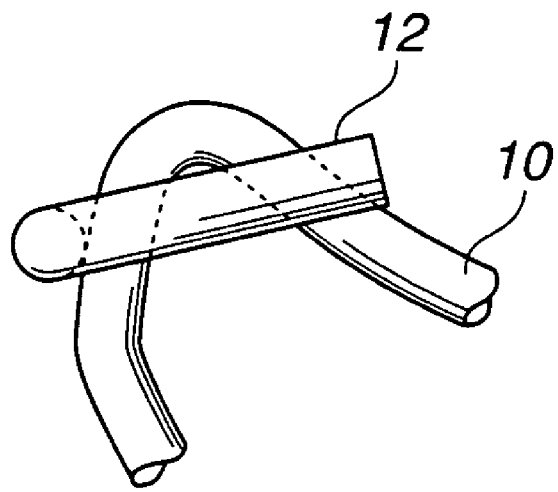
FIG. 4 is a view in a direction of the arrow line A in FIG. 3.

In contrast, the approximately L-shaped rod 12 is used to prevent the seatbelt 2 from being removed from the webbing guide portion 10*a* to the retractor 3 side. The rod 12 is disposed approximately in parallel with the bracket 7 with end portion thereof in a lateral direction fixedly secured to the outer periphery of the bent portion of the rod 10 located between the straight portion and the webbing guide portion 10*a* thereof (refer to FIG. 4), and the other end of the rod 12 is opened.

The rod 12 is provided to prevent a removal of the seatbelt 2 from the webbing guide portion 10*a* as described above. Alternatively, the removal of the seatbelt 2 may be prevented by covering the webbing guide portion 10*a* with a resin cover and the like in place of the rod 12.

Figure 5:
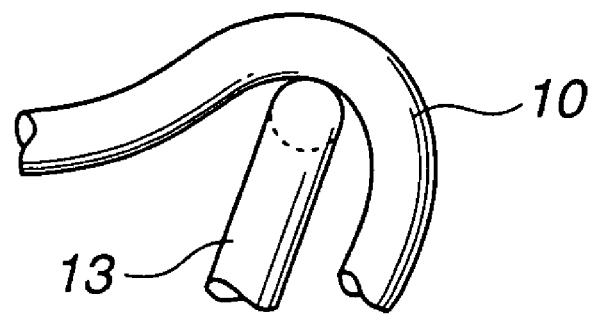
FIG. 5 is the view in the direction of the arrow line B in FIG. 3.

Further, the end portion of the rod 13 is abutted against and fixedly secured to the inside of the bent portion of the rod 10 located between the straight portion and the webbing guide portion 10*a* thereof (refer to FIG. 5), and the base end of the rod 13 is fixedly secured to the end of the bracket 9 (the end opposite of an attachment hole to the vehicle body) disposed to a third portion of the vehicle body in the vicinity of the bracket 8. The rod 13 is an auxiliary member for supporting the rod 10 from under the webbing guide portion 10*a* so as to prevent the rod 10 from falling down in the front direction of the vehicle body when a load is applied thereto.

Note that it is preferable that the portions of the rods 10, 11, 12, with which the seatbelt 2 comes into contact, are covered with resin covers or coated with a resin material, thereby the winding property of the seatbelt 2 can be improved.

In the seatbelt guide device 4 arranged as described above, the seatbelt 2 extracted from the retractor 3 is extended from under the base portions of the rods 10 and 11 to the webbing guide portion 10*a* of the rod 10. Then, the seatbelt 2 is suspended and folded back in a predetermined direction by the webbing guide portion 10*a* toward the belt extraction unit 6 of the rear quarter trim 1, and extended from the belt extraction unit 6. The seatbelt 2 extended from the belt extraction unit 6 is combined with, for example, a waist seatbelt (not shown) and constitutes a three-point type seatbelt. With this arrangement, the chest of a passenger is securely held by the seatbelt 2 drawn out of the belt extract unit 6 as well as the waist of the passenger is held by the waist belt (not shown).

At this time, although the seatbelt 2 contacts the webbing guide portion 10*a* of the rod 10 and a load is applied thereto, the seatbelt 2 fits in the arc shape of the webbing guide portion 10*a* and is prevented from slipping down. The load generated by the seatbelt 2 is dispersed by the three rods 10, 11, 13. Accordingly, even if an impact acts on the seatbelt 2, since the impact is received by the rods 10, 11, 13 in a dispersed state, it is possible to prevent the concentration of the load due to the impact to the portions of the vehicle body through which the rods 10, 11, 13 are attached thereto. As a result, it is not necessary to provide large brackets with the vehicle body to attach the rods thereto. Further, the load can be transmitted to the vehicle body under desirable optimum conditions which are set according to the restraining conditions of the respective rods in consideration of the load received from the seatbelt 2, the radii, the bent shapes, the materials and the span lengths of the respective rods 10, 11, 13, the positions of the vehicle body at which the rods are attached to the vehicle body, the shapes of the attachment positions, and the like. As a result, the load applied to the vehicle body can be reduced, and a required strength can be secured also with respect to the vibration received from the vehicle body, so that the durability of the rods 10, 11, 13 can be improved.

Since the seatbelt guide device 4 in this embodiment is arranged by using the small and light brackets 7, 8, 9 formed of sheet metal and the rods 10, 11, 12, 13 formed by bending readily available rod members, the weight and the cost of parts can be reduced while securing the strength necessary to provide a belt folding back function.

Moreover, since design freedom for the layout is increased by the reduction in size and weight of the parts, it is not necessary to provide a guide stay and the like in a compartment to fold back the seatbelt by accommodating the retractor 3 and the seatbelt guide device 4 in the rear quarter trim 1, which contributes to the improvement of the seatbelt guide device 4 as a commercial commodity without spoiling its good appearance in the compartment.

Figure 6:
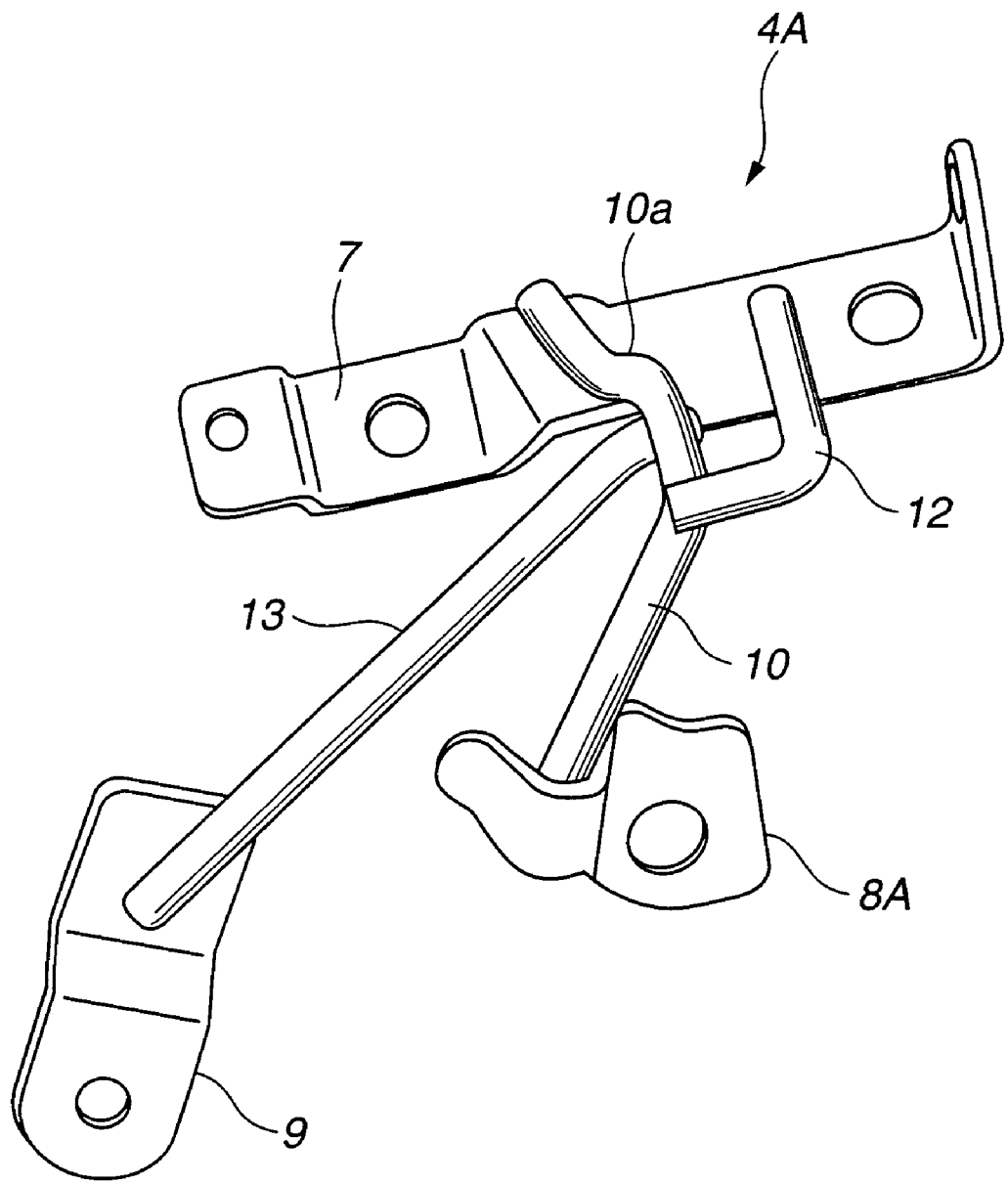
FIG. 6 is a perspective view showing the arrangement of the seatbelt guide device according to a second embodiment of the present invention.

Next, a second embodiment of the present invention will be explained. FIG. 6 is a perspective view showing the arrangement of a seatbelt guide device according to the second embodiment of the present invention.

The second embodiment simplifies the arrangement of the seatbelt guide device 4 of the first embodiment described above by omitting the rod 11 and the reinforcement member 14 used therein. That is, even if the rods 10 and 11 are omitted, the strength of the overall seatbelt guide device 4 is not largely affected thereby. Accordingly, a lighter and less expensive seatbelt guide device can be realized by omitting these rods.

As shown in FIG. 6, the seatbelt guide device 4A of the second embodiment comprises a bracket 8A, the brackets 7 and 9, and rods 10, 12 and 13 by omitting the rod 11 and the reinforcement member 14. The bracket 8A is a modification of the bracket 8 and has a smaller size than that of the bracket 8. The bracket 8A is formed in a shape obtained by removing the rib-shaped projection for securing the rod 11 from the bracket 8 of the first embodiment, and the relationship between the brackets 7, 8A, 9 and the rods 10, 12, 13 is approximately the same as that of the first embodiment except that the load from the seatbelt 2 is dispersed to the rods 10 and 13 only.

In the second embodiment, the size of the bracket 8A can be made smaller than that of the bracket 8 in the first embodiment described above by omitting the rod 11 and the reinforcing member 14. Accordingly, not only can the weight and the cost of the seatbelt guide device 4 can be further reduced, but also the winding property of the seatbelt 2 can be maintained in a good state when the distance from a belt folding-back portion to the retractor 3 is short and the seatbelt 2 is twisted by reducing the number and the size of parts that would otherwise interfere with the seatbelt 2.

Figure 7:
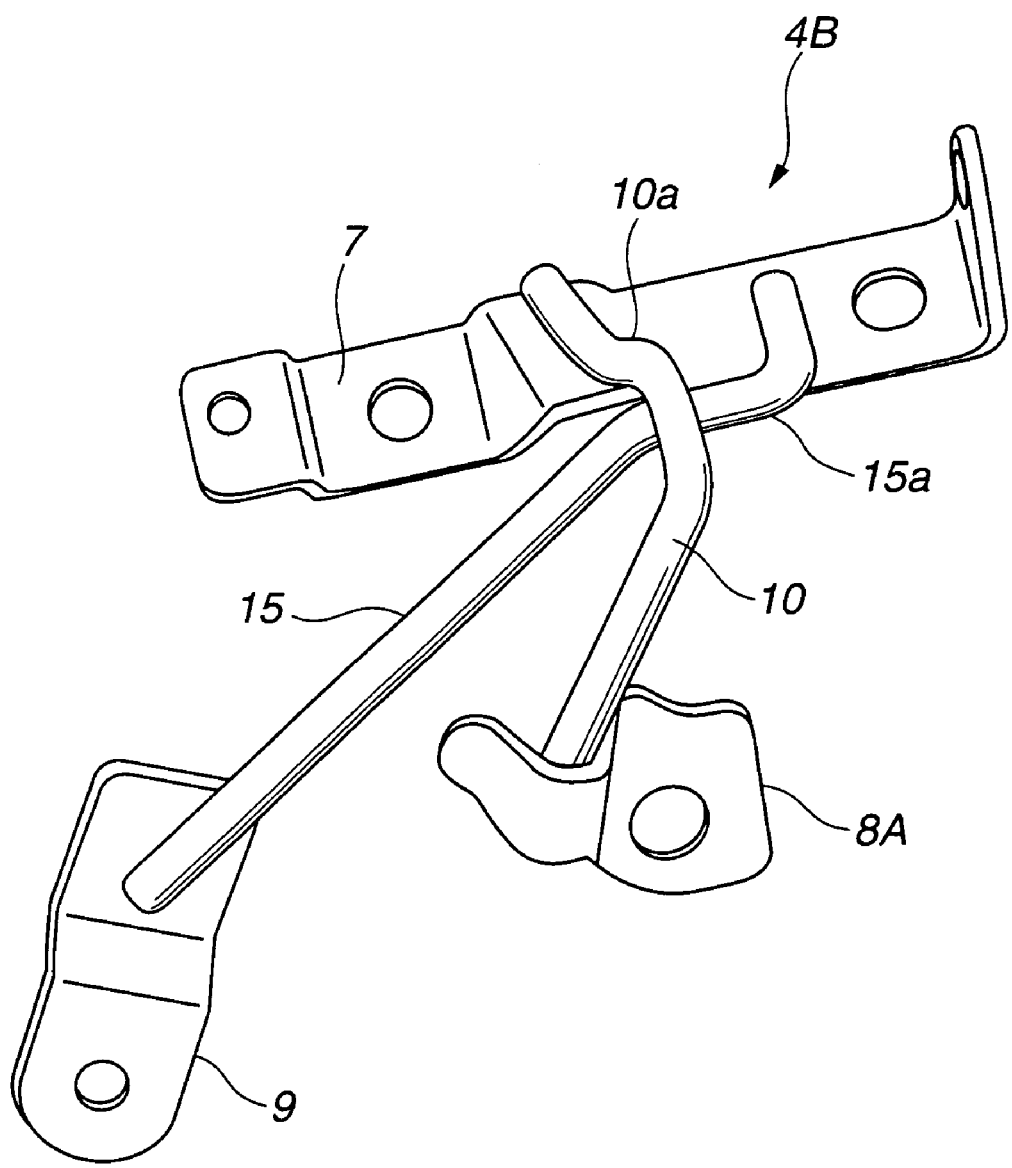
FIG. 7 is the perspective view showing the arrangement of the seatbelt guide device according to a third embodiment of the present invention.

Next, a third embodiment of the present invention will be explained. FIG. 7 is a perspective view showing the arrangement of a seatbelt guide device 4B according to the third embodiment of the present invention.

In the third embodiment, the number of parts is further reduced by integrating the rod 12 with the rod 13. That is, the seatbelt guide device 4B of the third embodiment shown in FIG. 7 is provided with a rod 15 in place of the rod 13 used in the seatbelt guide device 4, and the end portion of the rod 15 is extended so that the end portion thereof also performs the function of the rod 12.

More specifically, the rod 15 is formed in an L-shape similar to that of the rod 12 by extending the end portion of the rod 13 that is fixedly secured to the inside of the bent portion of the rod 10 located between the straight portion and the webbing guide portion 10a thereof, and the L-shaped portion of the rod 15 forms an easy disconnection preventive portion 15a for preventing from unexpectedly removing the seatbelt 2 from the webbing guide portion 10a.

With the above arrangement, the third embodiment can achieve a further cost reduction by more reducing the number of parts while maintaining an excellent operational easiness similar to that of the second embodiment because it is not necessary to separately provide the rod 12.

It is needless to say that the rod 15, which also performs the function of the rod 12, may be applied to the seatbelt guide device 4 of the first embodiment.

Figure 8:
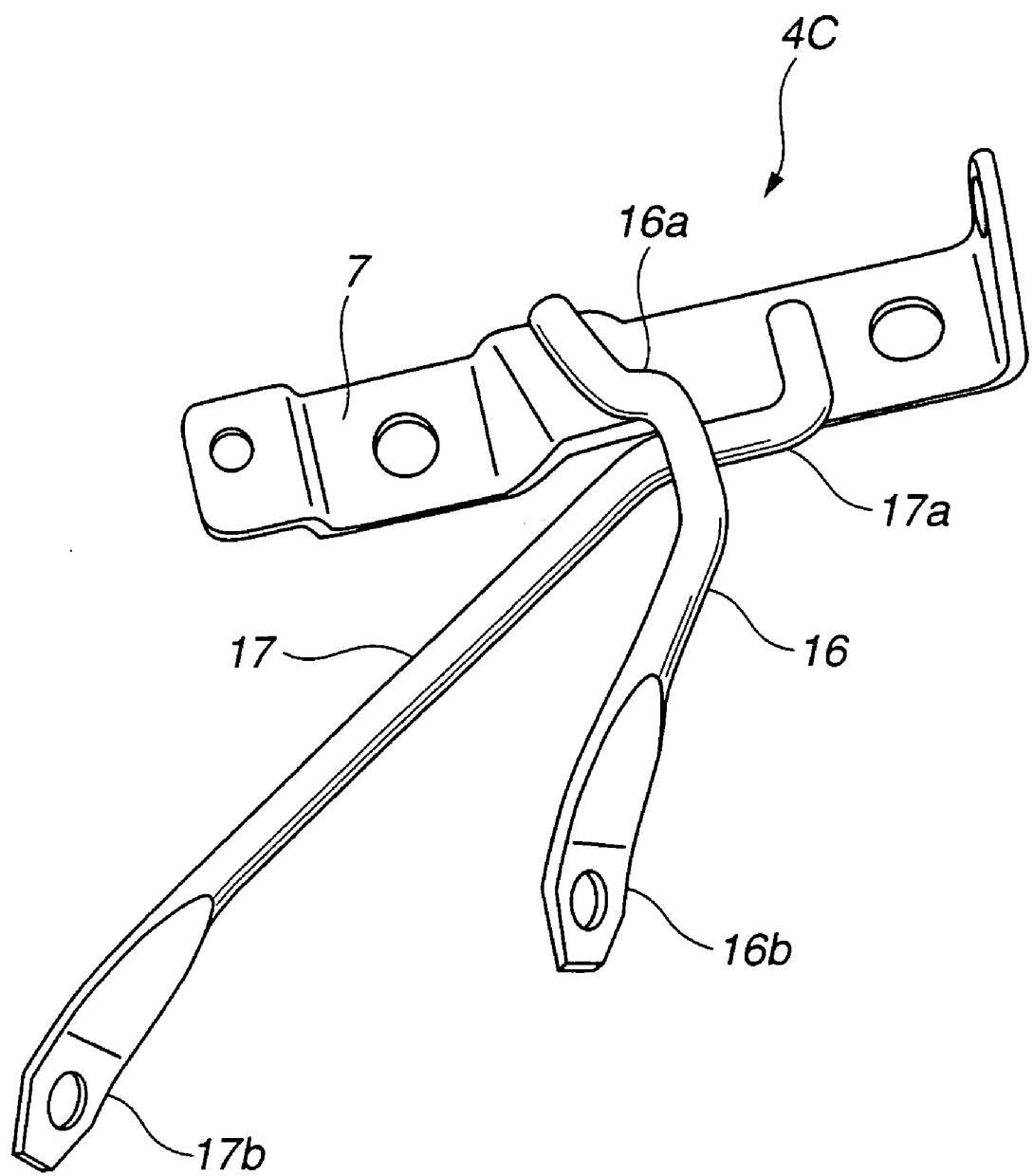
FIG. 8 is the perspective view showing the arrangement of the seatbelt guide device according to a fourth embodiment of the present invention.
Figure 9:
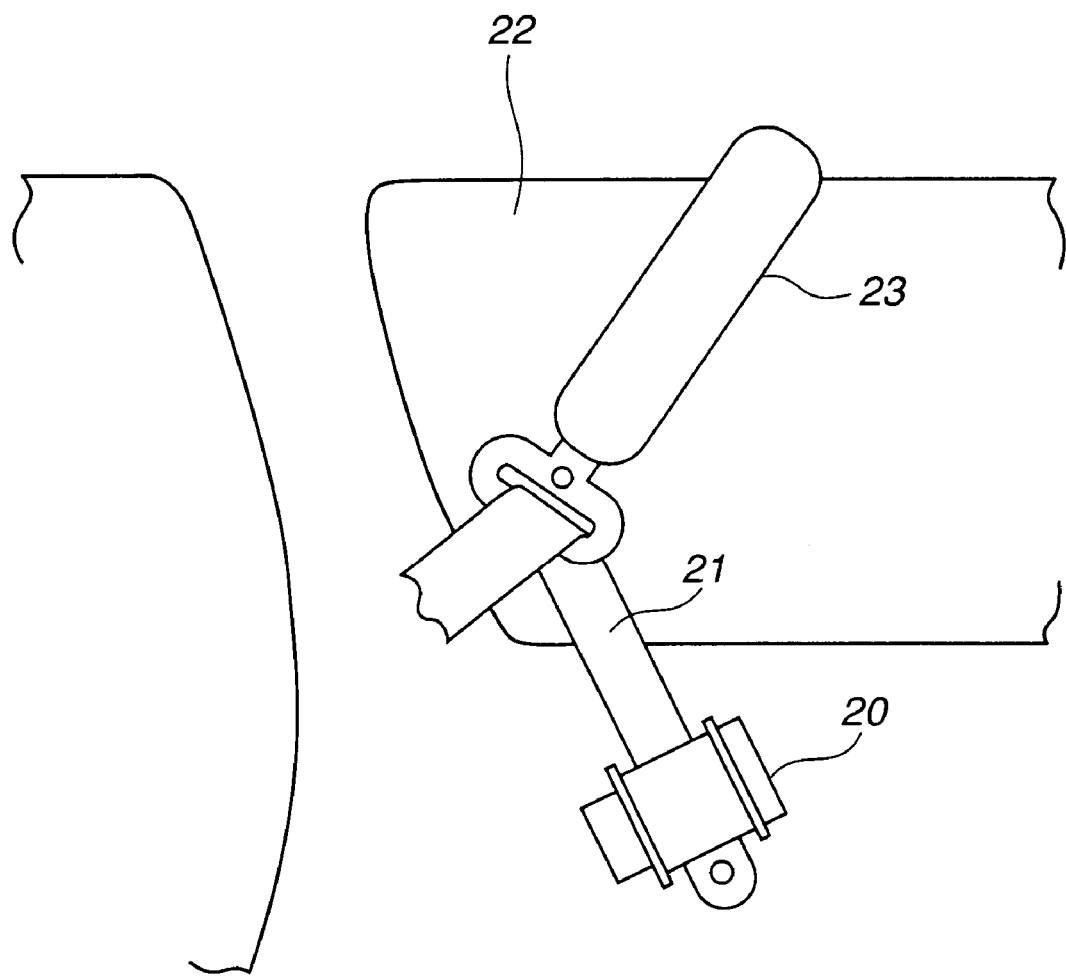
FIG. 9 is the view explaining a folded back state of a conventional seatbelt.

Next, a fourth embodiment of the present invention will be explained. FIG. 8 is the perspective view showing the arrangement of the seatbelt guide device according to the fourth embodiment of the present invention.

In the fourth embodiment as illustrated in FIG. 8, brackets 8A, 9 of the third embodiemtent for securing rods to the vehicle body are eliminated.

The seatbelt guide device 4C shown in FIG. 8 eliminates the bracket 8A by using a rod 16 having a base end that is modified to permit the rod 16 to be directly fixed to the vehicle body in place of the rod 10 which is fixedly secured to the vehicle body through the bracket 8A. Further, the seatbelt guide device 4C of FIG. 8 eliminates the bracket 9 by using a rod 17 having a base end that is modified to permit the rod 17 to be directly fixed to the vehicle body in place of the rod 15 of the third embodiment which is fixedly secured to the vehicle body through the bracket 9.

That is, the rod 16 includes a webbing guide portion 16a and a vehicle body attachment portion 16b. The webbing guide portion 16a is formed in the same shape as that of the webbing guide portion 10a of the rod 10, and the vehicle body attachment portion 16b is formed by molding the end portion of the rod 16 at the base end thereof to make flat by a press (or forging) machine and the like, and an attachment hole is drilled therethrough. The webbing guide portion 16a is fixedly secured to the bracket 7 at the end portion thereof by welding and the like, and the vehicle body attachment portion 16b on the base end thereof is directly attached and secured to the vehicle body by a bolt and the like.

Further, in the fourth embodiment illustrated in FIG. 8, rod 17 includes an easy disconnection preventive portion 17a and a vehicle body attachment portion 17b. The preventive portion 17a is formed in the same shape as that of the preventive portion 15a of the rod 15, and the vehicle body attachment portion 17b is formed by molding the end portion of the rod 17 at the base end thereof to a flat shape by a press (or forging) machine and the like, and an attachment hole is drilled therethrough. A base portion of the removal preventing portion 17a is fixedly secured to the inside of the bent portion of the rod 16 near the webbing guide portion 16a thereof by welding and the like, and the vehicle body attachment portion 17b at the base end of the rod 17 is directly attached and secured to the vehicle body by the bolt and the like.

With this arrangement, the size and the weight of the seatbelt guide device 4C can be further reduced, and the degree of design freedom of the layout can be further increased by reducing the size of the required space in which the seatbelt guide device 4C is installed.

It is also possible to eliminate the bracket 7 by forming the end portion of the webbing guide portion 16a of the rod 16 in the same shape as that of the vehicle body attachment portion 16b on the base end thereof. In this case, the seatbelt guide device 4C can comprise only two rods without using any brackets at all.

As described above, in these embodiments, since the first rod, in which the guide portion is formed to suspend and fold back the seatbelt, and the second rod for dispersing the load applied to the main rod are restrained agaisnt each other and secured to the vehicle body, the seatbelt guide device 4 can be reduced in size and weight while securing the required strength, so that the cost of the device can be reduced and the degree of design freedom of the layout of the seatbelt guide device 4 can be improved.

In the present invention, different embodiments can be arranged in a wide range of configurations based on the invention, without departing from the spirit and the scope of the present invention. The present invention is by no means restricted by any particular embodiments thereof except that it is restricted by the accompanying claims.

What is claimed is:

1. A seatbelt guide device for a vehicle for guiding a seatbelt extracted from a retractor, comprising:

a first rod having a guide portion, formed as an arc-shaped portion of the first rod, for suspending and folding back the seatbelt, wherein one end of the first rod proximal to the guide portion is configured to be secured to a first portion of a body of the vehicle in proximity to the retractor, and wherein another end of the first rod distal from the guide portion is configured to be secured to a second portion of the body between the first portion and the retractor; and a second rod for dispersing a load applied to the first rod;

wherein the second rod is secured to the guide portion and configured at one end to be secured to a third portion of the body in proximity to the second portion of the body.

2. The seatbelt guide device according to claim 1, further comprising a retaining rod for preventing a disconnection of the seatbelt from the guide portion.

3. The seatbelt guide device according to claim 1, further comprising a cover for preventing a disconnection of the seatbelt from the guide portion.

4. The seatbelt guide device according to claim 1, further comprising:
   a third rod disposed in parallel with the first rod and coupled with the first rod by a support member;
   wherein one end of the third rod is configured to be secured to the first portion of the body and the other end of the third rod is configured to be secured to the second portion of the body.

5. The seatbelt guide device according to claim 1, wherein:
   the second rod that is secured to the guide portion extends to a side of the guide portion to form a removal preventing portion for preventing the removal of the seatbelt from the guide portion.

6. The seatbelt guide device according to claim 1, further comprising:
   a bracket for securing at least one of the first rod and the second rod to the vehicle body.

7. The seatbelt guide device according to claim 1, wherein:
   at least one of the first rod and the second rod has a flat-plate-shaped vehicle body attaching portion formed thereto for fixing the rod to the vehicle body.

* * * * *